US011522585B2

(12) United States Patent
Ser et al.

(10) Patent No.: US 11,522,585 B2
(45) Date of Patent: Dec. 6, 2022

(54) METHOD AND SYSTEM FOR PROCESSING UPLINK SIGNAL IN CLOUD RADIO ACCESS NETWORKS

(71) Applicant: HON LIN TECHNOLOGY CO., LTD., Taipei (TW)

(72) Inventors: Xiang-Quan Ser, Hsinchu (TW); Chi-Chen Wang, Hsinchu (TW); Shang-Ho Tsai, Hsinchu (TW); Hsin-Hung Chou, Hsinchu (TW); Wei-Han Hsiao, Hsinchu (TW)

(73) Assignee: HON LIN TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 17/519,254

(22) Filed: Nov. 4, 2021

(65) Prior Publication Data

US 2022/0149905 A1 May 12, 2022

Related U.S. Application Data

(60) Provisional application No. 63/112,125, filed on Nov. 10, 2020.

(51) Int. Cl.
*G06F 11/22* (2006.01)
*H04B 7/0456* (2017.01)
(Continued)

(52) U.S. Cl.
CPC ....... *H04B 7/0456* (2013.01); *H04L 25/4927* (2013.01); *H04W 72/0413* (2013.01); *G06F 11/2284* (2013.01)

(58) Field of Classification Search
CPC ..... H04L 5/0007; H04L 67/10; H04L 5/0048; H04L 27/2662; H04L 67/02; H04L 67/52; H04L 27/2657; H04L 67/306; H04W 72/0453; H04W 12/61; H04W 12/009; H04W 56/001; H04W 4/02; H04W 4/029; H04W 48/10; H04W 56/00; G06F 11/2284; G06F 9/4401; G06F 16/29; G06F 3/0482; G06F 16/9537; G06F 16/9535; G06F 21/575; G06F 16/285
(Continued)

(56) References Cited

U.S. PATENT DOCUMENTS 8,233,556 B2 7/2012 Waters et al.
10,334,478 B2 6/2019 Boldi et al.
(Continued)

FOREIGN PATENT DOCUMENTS

CN 110785975 A 2/2020
CN 106576393 B 8/2020

*Primary Examiner* — Eva Y Puente
(74) *Attorney, Agent, or Firm* — ScienBiziP, P.C.

(57) ABSTRACT

A method and a system for processing uplink signals in cloud radio access networks are disclosed The system comprising a baseband unit and a number of remote radio heads. The baseband unit and the remote radio heads are connected through fronthaul links. When one remote radio head receives a signal transmitted from a user equipment, the remote radio head first encodes the received signal according to a post-coding matrix, then quantizes the encoded signal according to a number of quantization bits allocated to the user equipment, and finally transmits the quantized signal to the baseband unit.

10 Claims, 2 Drawing Sheets

(51) Int. Cl.
*H04W 72/04* (2009.01)
*H04L 25/49* (2006.01)
(58) Field of Classification Search
USPC .......................................... 375/262
See application file for complete search history.

(56) References Cited

U.S. PATENT DOCUMENTS

| 2010/0157878 | A1* | 6/2010 | Zeitler | H04L 1/0077 |
| | | | | 370/315 |
| 2016/0056867 | A1* | 2/2016 | Kusunoki | H04B 7/0456 |
| | | | | 375/267 |
| 2017/0279489 | A1* | 9/2017 | Singh | H04M 11/062 |

\* cited by examiner

METHOD AND SYSTEM FOR PROCESSING UPLINK SIGNAL IN CLOUD RADIO ACCESS NETWORKS

FIELD

The subject matter herein generally relates to wireless communications, and more particularly, to a method for uplink signal processing in cloud radio access networks, and a system thereof.

BACKGROUND

In Cloud Radio Access Networks (C-RAN), the capacity of fronthaul network is restricted and limited to reduce the cost of fiber deployment between a baseband unit (BBU) and a plurality of remote radio heads (RRHs). Since the fronthaul load increases with the number of RRHs, reducing the fronthaul loading accordingly is an issue.

BRIEF DESCRIPTION OF THE DRAWINGS

Implementations of the present technology will now be described, by way of embodiment, with reference to the attached figures, wherein.

DETAILED DESCRIPTION

Figure 1:
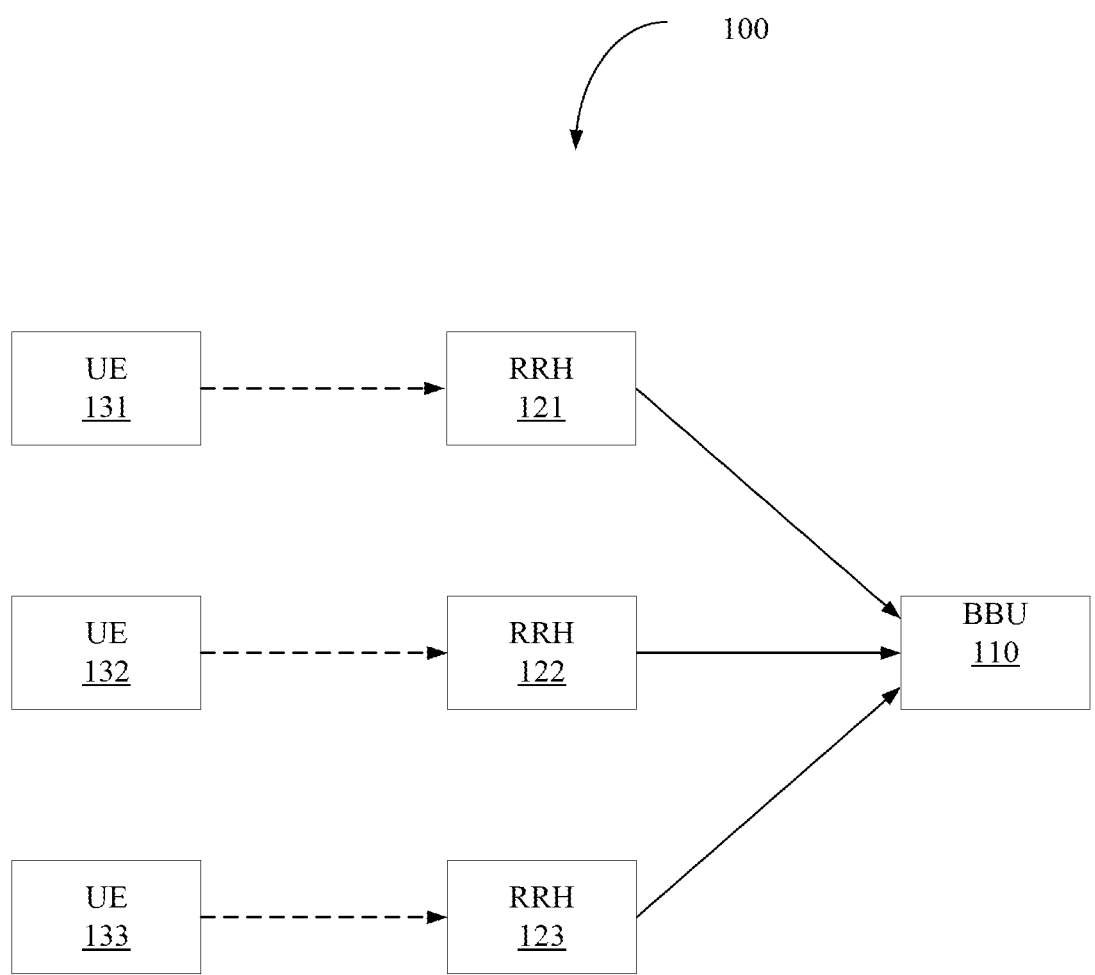
FIG. 1 is a schematic diagram of one embodiment of a system for processing uplink signals in cloud radio access networks.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one".

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a system 100. The system 100 comprises at least one baseband unit (BBU) 110 and a plurality of remote radio heads (RRHs) 121-123. The RRHs 121-123 are connected to the BBU 110 through fronthaul links, and are connected to a plurality of user equipments (UEs) 131-133 through wireless communication. The number of RRHs 121-123 and UEs 131-133 in FIG. 1 is for illustrative purposes only. For example, although the system 100 in FIG. 1 contains three RRHs, in practice, the number of RRHs can be set according to requirements.

In uplink stage, the BBU communicates wirelessly with K UEs through N RRHs. To reduce the load on the fronthaul network, the received signal of each RRH is compressed before transmitting to the BBU.

Taking FIG. 1 as an example, the received signal $y_n$ of the n th RRH can be expressed by equation (1):

$$y_n = \sum_{k=1}^{K} h_{k,n} s_k + z_n = H_n s + z_n \qquad (1)$$

Where $$s = \begin{bmatrix} s_1 \\ M \\ s_K \end{bmatrix},$$

$s_k$ is the symbols sent from the $k_{th}$ UE; each RRH is equipment with M receiving antennas, and $$H_n = \begin{bmatrix} h_{1,1,n} & K & h_{1,k,n} & K & h_{1,K,n} \\ M & & O & & \\ h_{m,1,n} & & h_{m,k,n} & & h_{m,K,n} \\ M & & & O & \\ h_{M,1,n} & K & h_{M,k,n} & K & h_{M,K,n} \end{bmatrix} = [h_{1,n} \ \Lambda \ h_{K,n}],$$

and $h_{m,K,n}$ is the channel gain coefficient between the m th antenna and the k th user, and $z_n$ is the received noise. In this example, the received noise is an additive white Gaussian distribution with a mean value 0 and a variance value $\sigma^2$.

In one embodiment, the RRHs cooperate with the UEs for uplink transmission, and in relation to the inter-channel interference problem, the BBU determines a post-coding matrix for post-coding the received signal by the RRHs based on the channel matrix between the RRHs and the UEs, where the (k,n) element of the post-coding matrix is used for post-coding by the n th RRH to the k th UE. In the embodiment, post-codings used by different RRHs to different UEs are different.

Taking FIG. 1 as an example, after the n th RRH receives the signal $y_n$, it first post-encodes the signal $y_n$ according to the post-coding matrix and obtains $\bar{y}_n$, according to equation (1), the $\bar{y}_n$ can be expressed using equation (2):

$$\bar{y}_n = \begin{bmatrix} \bar{y}_{1,n} \\ M \\ \bar{y}_{M,n} \end{bmatrix} = F_n H_n s + F_n z_n \qquad (2)$$

where $F_n$ is the post-coding vector used by the n th RRH.

The n th RRH then quantizes the signal $\bar{y}_n$ to obtain $\tilde{y}_n$, and transmits same to the BBU through a limited capacity fronthaul link. According to equation (2), $\tilde{y}_n$ can be expressed using equation (3):

$$\tilde{y}_n = F_n H_n s + F_n z_n + q_n \quad (3)$$

wherein $q_n = \tilde{y}_n - \bar{y}_n$, being the value of difference between the quantized signal and the un-quantized signal, called the quantization error, also known as quantization noise.

The BBU determines the minimum number of quantization bits required by each RRH and allocates a number of the quantization bits to each UE served by each RRH according to the minimum number of quantization bits required by each RRH. The BBU notifies each RRH of the quantization bits allocated to each UE served by the RRH so that the RRH can quantize and compress received signal based on the allocated quantization bits for the UE.

Specifically, since the channel information is known by the BBU, in order to continue compliance of the received noise with the additive white Gaussian distribution with mean value 0 and variance value $\sigma^2$ after quantization, the BBU can allocate a number of quantization bits to each of the UEs served by each of the RRHs based on the channel information, a size of constellation map, and the post-coding matrix.

Figure 2:
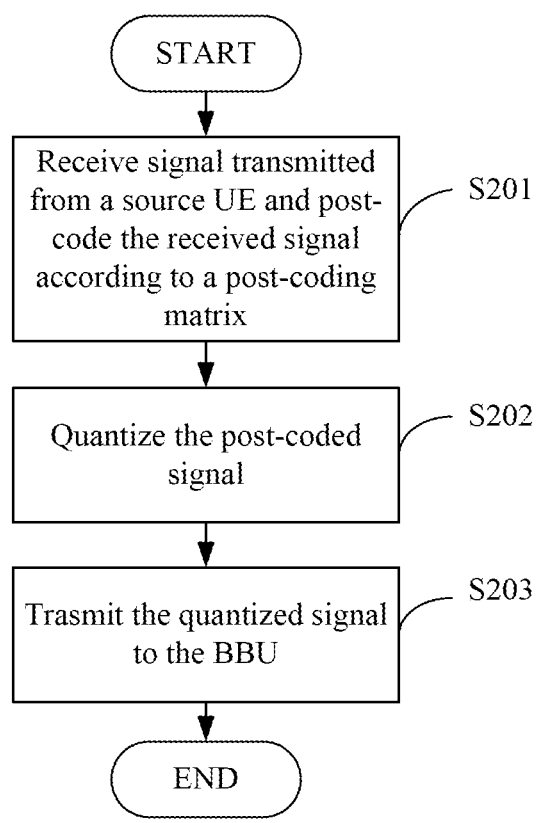
FIG. 2 is a flow chart of one embodiment of a method for the processing in cloud radio access networks.

FIG. 2 illustrates a flow chart of a method for processing uplink signals in a C-RAN. The method can be implemented in RRHs 121-123 in FIG. 1.

At step S201, the RRH receives signal transmitted from a source UE and post-codes the received signal according to the post-coding matrix.

At step S202, the RRH quantizes the post-coded signal according to the number of quantization bits allocated to the source UE.

At step S203, the RRH transmits the quantized signal to the BBU.

The BBU performs a maximum ratio combining of the received signal to obtain information transmitted from the source UE.

In summary, the system and the method for uplink signal processing in the C-RAN is based on the premise of achieving the best performance without quantization, and achieving the best performance with very little quantization by a mechanism for allocating the least number of quantization bits, and at the same time achieving the purpose of reducing the fronthaul load.

The embodiments shown and described above are only examples. Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for processing uplink signal for a system in cloud radio access networks, the system comprising a baseband unit and a plurality of remote radio heads, wherein the baseband unit is connected to the plurality of remote radio heads through fronthaul links, each of the plurality of remote radio heads is configured to perform:

receiving signal transmitted from a source user equipment;

post-coding the received signal based on a post-coding matrix;

quantizing the post-coded signal based on a number of quantization bits allocated to the source user equipment; and transmitting the quantized signal to the baseband unit.

2. The method of claim 1, wherein:

the system further comprising a plurality of user equipments;

the plurality of remote radio heads connected to the plurality of user equipments through wireless communication; and the post-coding matrix is determined by the baseband unit based on the channel matrix between the plurality of remote radio heads and the plurality of user equipments.

3. The method of claim 2, wherein a (k,n) element of the post-coding matrix is used for post-coding by a n th remote radio head to a k th user equipment, and post-codings used by different remote radio heads to different user equipments are different.

4. The method of claim 1, wherein the baseband unit is configured to perform:

determining a minimum number of quantization bits required by each of the plurality of remote radio heads.

5. The method of claim 4, wherein the baseband unit is further configured to perform:

allocating a number of quantization bits to each of the user equipments connected to each of the plurality of remote radio heads based on the minimum number of quantization bits required by each of the plurality of remote radio heads.

6. A system for processing uplink signal in cloud radio access networks, the system comprising a baseband unit connected a plurality of remote radio heads through fronthaul links, wherein each of the plurality of remote radio heads is configured to perform:

receiving signal transmitted from a source user equipment;

post-coding the received signal based on a post-coding matrix;

quantizing the post-coded signal based on a number of quantization bits allocated to the source user equipment; and transmitting the quantized signal to the baseband unit.

7. The system of claim 6, wherein:

the system further comprising a plurality of user equipments;

the plurality of remote radio heads connected to the plurality of user equipments through wireless communication; and the post-coding matrix is determined by the baseband unit based on the channel matrix between the plurality of remote radio heads and the plurality of user equipments.

8. The system of claim 7, wherein a (k,n) element of the post-coding matrix is used for post-coding by a n th remote radio head to a k th user equipment, and post-codings used by different remote radio heads to different user equipments are different.

9. The system of claim 6, wherein the baseband unit is configured to perform:
- determining a minimum number of quantization bits required by each of the plurality of remote radio heads.

10. The system of claim 9, wherein the baseband unit is further configured to perform:
- allocating a number of quantization bits to each of the user equipments connected to each of the plurality of remote radio heads based on the minimum number of quantization bits required by each of the plurality of remote radio heads.

\* \* \* \* \*